United States Patent
Iwashita et al.

(10) Patent No.: US 8,716,965 B2
(45) Date of Patent: May 6, 2014

(54) SYNCHRONOUS MOTOR CONTROL DEVICE FOR CONTROLLING SYNCHRONOUS MOTOR TO CARRY OUT POWER REGENERATIVE OPERATION AND STOP SYNCHRONOUS MOTOR AT THE TIME OF POWER FAILURE

(71) Applicant: Fanuc Corporation, Yamanashi (JP)

(72) Inventors: Yasusuke Iwashita, Yamanashi (JP); Hajime Ogawa, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/780,671

(22) Filed: Feb. 28, 2013

(65) Prior Publication Data

US 2013/0271048 A1  Oct. 17, 2013

(30) Foreign Application Priority Data

Apr. 13, 2012 (JP) ................................. 2012-092269

(51) Int. Cl.
*H02P 21/00* (2006.01)

(52) U.S. Cl.
CPC .................................. *H02P 21/0046* (2013.01)
USPC .................. 318/400.02; 318/400.01; 318/700

(58) Field of Classification Search
CPC ........................... H02P 21/0046; H02P 21/005
USPC .................. 318/400.02, 400.01, 700
See application file for complete search history.

(56) References Cited

U.S. PATENT DOCUMENTS

| | | | |
|---|---|---|---|
| 5,444,351 A | 8/1995 | Yamamura et al. | |
| 5,504,404 A | * 4/1996 | Tamaki et al. | 318/432 |
| 6,326,762 B1 | 12/2001 | Jiang et al. | |
| 2002/0084766 A1 | 7/2002 | Schwesig | |
| 2007/0159130 A1 | 7/2007 | Kaneko et al. | |
| 2007/0182358 A1 | 8/2007 | Iura et al. | |

FOREIGN PATENT DOCUMENTS

| | | |
|---|---|---|
| CN | 1285652 A | 2/2001 |
| CN | 1922783 A | 2/2007 |
| CN | 101001068 A | 7/2007 |
| DE | 10059173 C1 | 3/2002 |
| DE | 102010021865 A1 | 12/2011 |
| JP | 5-051182 | 3/1993 |
| JP | 2007-067397 | 3/1995 |
| JP | 767397 A | 3/1995 |
| JP | 10-243675 | 9/1998 |
| JP | 2002-369564 | 12/2002 |
| JP | 2007-151336 | 6/2007 |

OTHER PUBLICATIONS

Office Action dated Dec. 19, 2013, corresponds to Chinese patent application No. 201310124635.8.
Office Action dated Dec. 19, 2013, corresponds to German patent application No. 102013005941.0.

* cited by examiner

*Primary Examiner* — Bentsu Ro
*Assistant Examiner* — David Luo
(74) *Attorney, Agent, or Firm* — Lowe Hauptman & Ham, LLP

(57) ABSTRACT

A second q-axis current command value, which is set by a q-axis current command value setting unit when an alternating-current power source fails at the time of driving of a synchronous motor, and a second d-axis current command value, which is set by a d-axis current command value setting unit when the alternating-current power source fails at the time of the driving of the synchronous motor, are set so that an absolute value of power per unit time of the synchronous motor is equal to loss per unit time of the synchronous motor.

4 Claims, 3 Drawing Sheets

US 8,716,965 B2

SYNCHRONOUS MOTOR CONTROL DEVICE FOR CONTROLLING SYNCHRONOUS MOTOR TO CARRY OUT POWER REGENERATIVE OPERATION AND STOP SYNCHRONOUS MOTOR AT THE TIME OF POWER FAILURE

RELATED APPLICATIONS

The present application is based on, and claims priority from, Japanese Application Number 2012-092269, filed Apr. 13, 2012, the disclosure of which is hereby incorporated by reference herein in its entirety.

BACKGROUND OF THE INVENTION

1. Field of the Invention

The present invention relates to a synchronous motor control device for controlling a synchronous motor to carry out a power regenerative operation to return regenerative energy, which is generated during speed reduction of the synchronous motor, to the alternating-current power source side, and stop the synchronous motor when an alternating-current power source fails.

2. Description of Related Art

Conventionally, in order to handle regenerative energy, which is generated during speed reduction of a motor, a motor control device for controlling a motor to carry out power regenerative operation to return regenerative energy to the alternating-current power source side is used. In the case where such a power regenerative operation is carried out, it is not possible to return regenerative energy, which is generated during speed reduction of the motor, to the alternating-current power source side when the alternating-current power source fails, and therefore, an over-voltage (anomalous voltage) of a DC link part, which is connected in parallel to an inverter configured to supply alternating-current power to the motor, occurs. In order to avoid the over-voltage across the DC link part, a motor control device, in which a regenerative resistor or dynamic brake is provided to consume regenerative energy caused by the speed reduction of the motor when an alternating-current power source fails, is proposed in, for example, Japanese Unexamined Patent Publication (Kokai) No. 10-243675 (JP10-243675A) and Japanese Unexamined Patent Publication (Kokai) No. 2002-369564 (JP2002-369564A).

However, in the case where a regenerative resistor or dynamic brake is provided in a motor control device, it is necessary to increase the resistance of the regenerative resistor or the capacity of the dynamic brake as the output of the motor increases, and therefore, there is such a disadvantage that the cost of the motor control device increases as the resistance of the regenerative resistor or the capacity of the dynamic brake increases.

On the other hand, an induction motor control device for controlling an induction motor so as to make it possible to handle regenerative energy caused by speed reduction of a motor when an alternating-current power source fails without providing a regenerative resistor or dynamic brake, is proposed in, for example, Japanese Unexamined Patent Publication (Kokai) No. 5-51182 (JP5-51182A). In such an induction motor control device, the value of a q-axis current of the induction motor increases during the speed reduction of the induction motor when the alternating-current power source fails, by controlling the value of a d-axis current of the induction motor under the same torque condition, and the generation of the regenerative energy, which is returned to the alternating-current power source side, is prevented by setting the operative efficiency of the induction motor at the time of the driving of the induction motor during the speed reduction of the induction motor lower than the operative efficiency of the induction motor at the time of the driving of the induction motor except for the driving of the induction motor during the speed reduction of the induction motor. Further, in the induction motor control device described above, at the time of the driving of the induction motor except for the driving of the induction motor during the speed reduction of the induction motor when the alternating-current power source fails, the value of the d-axis current is set to a value larger than the value of the d-axis current, which is set during the speed reduction of the induction motor, in order to set the operative efficiency of the induction motor larger than the operative efficiency of the induction motor during the speed reduction of the induction motor.

However, in the case where a synchronous motor is controlled so as to carry out the power regenerative operation, the q-axis current contributes to generation of a torque, and therefore, if the value of the d-axis current of the synchronous motor is suppressed and the value of the q-axis current of the synchronous motor is increased during the speed reduction of the synchronous motor when the alternating-current power source fails, the regenerative energy increases, and therefore, there is a possibility of the issuance of an over-voltage alarm due to an over-voltage at the DC link part, which is connected in parallel to the inverter configured to supply alternating-current power to the synchronous motor. Further, in the case where the value of the d-axis current is set to a value larger than zero at the time of the driving of the synchronous motor except for the driving of the synchronous motor during the speed reduction of the synchronous motor when the alternating-current power source fails, power consumed by the synchronous motor increases and the operating efficiency of the synchronous motor reduces remarkably.

SUMMARY OF THE INVENTION

As an aspect, the present invention provides a synchronous motor control device capable of avoiding an over-voltage across a DC link part, which is connected in parallel to an inverter configured to supply alternating-current power to a synchronous motor, without adversely affecting the cost and the operating efficiency of the synchronous motor, and stopping the synchronous motor both quickly and safely without issuing an over-voltage alarm when the alternating-current power source fails.

According to an aspect of the present invention, the synchronous motor control device for controlling a synchronous motor to carry out a power regenerative operation to return regenerative energy, which is generated during speed reduction of a synchronous motor, to the alternating current power source side, and stop the synchronous motor when an alternating-current power source fails, includes: a q-axis current and d-axis current detection unit configured to detect a q-axis current, which corresponds to a torque current of the synchronous motor, and a d-axis current, which corresponds to a magnetic excitation current of the synchronous motor, based on at least two of a first phase current, a second phase current and a third phase current, which flow through the synchronous motor, and a position of the synchronous motor; a q-axis current command value setting unit configured to set a first q-axis current command value of the synchronous motor, based on a difference between a speed of the synchronous motor and a speed command value for the synchronous motor when the alternating-current power source does not fail at the time of driving of the synchronous motor, and to set a second q-axis current command value of the synchronous motor when the alternating-current power source fails at the time of the driving of the synchronous motor; a d-axis current command value setting unit configured to set a first d-axis current command value of the synchronous motor to zero value when the alternating-current power source does not fail at the time of the driving of the synchronous motor, and to set a second d-axis current command value of the synchronous motor to a value larger than zero when the alternating-current power source fails at the time of the driving of the synchronous motor; and a drive unit configured to drive the synchronous motor based on the q-axis current, the d-axis current, the first or second q-axis current command value, and the first or second d-axis current command value, wherein the second q-axis current command value and the second d-axis current command value are set so that an absolute value of power per unit time of the synchronous motor is equal to loss per unit time of the synchronous motor.

Preferably, the second q-axis current command value is set based on a difference between the speed of the synchronous motor and the speed command value for the synchronous motor, and the second d-axis current command value is set based on a second q-axis current command value, which is set based on a difference between the speed of the synchronous motor and the speed command value for the synchronous motor.

Preferably, the second q-axis current command value and the second d-axis current command value are set based on a maximum power consumption, which can be accepted by the synchronous motor, or a predetermined power consumption.

Preferably, a first limit value of the second q-axis current command value, which is provided to limit a torque of the synchronous motor when an alternating-current power source fails at the time of the driving of a synchronous motor, is set to a value smaller than a second limit value of the second q-axis current command value, which is provided to limit the torque of the synchronous motor when the alternating-current power source does not fail at the time of the driving of the synchronous motor.

According to an aspect of the present invention, the second q-axis current command value and the second d-axis current command value are set so that the absolute value of power per unit time of the synchronous motor is equal to loss per unit time of the synchronous motor, and therefore, the regenerative power, which is generated when the alternating-current power source fails at the time of the driving of the synchronous motor is zero. Consequently, it is possible to avoid the over-voltage across a DC link part, which is connected in parallel to an inverter configured to supply alternating-current power to the synchronous motor, without adversely affecting the cost and the operating efficiency of the synchronous motor, and stop the synchronous motor both quickly and safely without issuing an over-voltage alarm when the alternating-current power source fails.

BRIEF DESCRIPTION OF THE DRAWINGS

The objects, features, and advantages of the present invention will be clear in the following embodiments, and the accompanying drawings. In the drawings.

DETAILED DESCRIPTION

Embodiments of the synchronous motor control device according to the present invention are explained with reference to the drawings.

Figure 1:
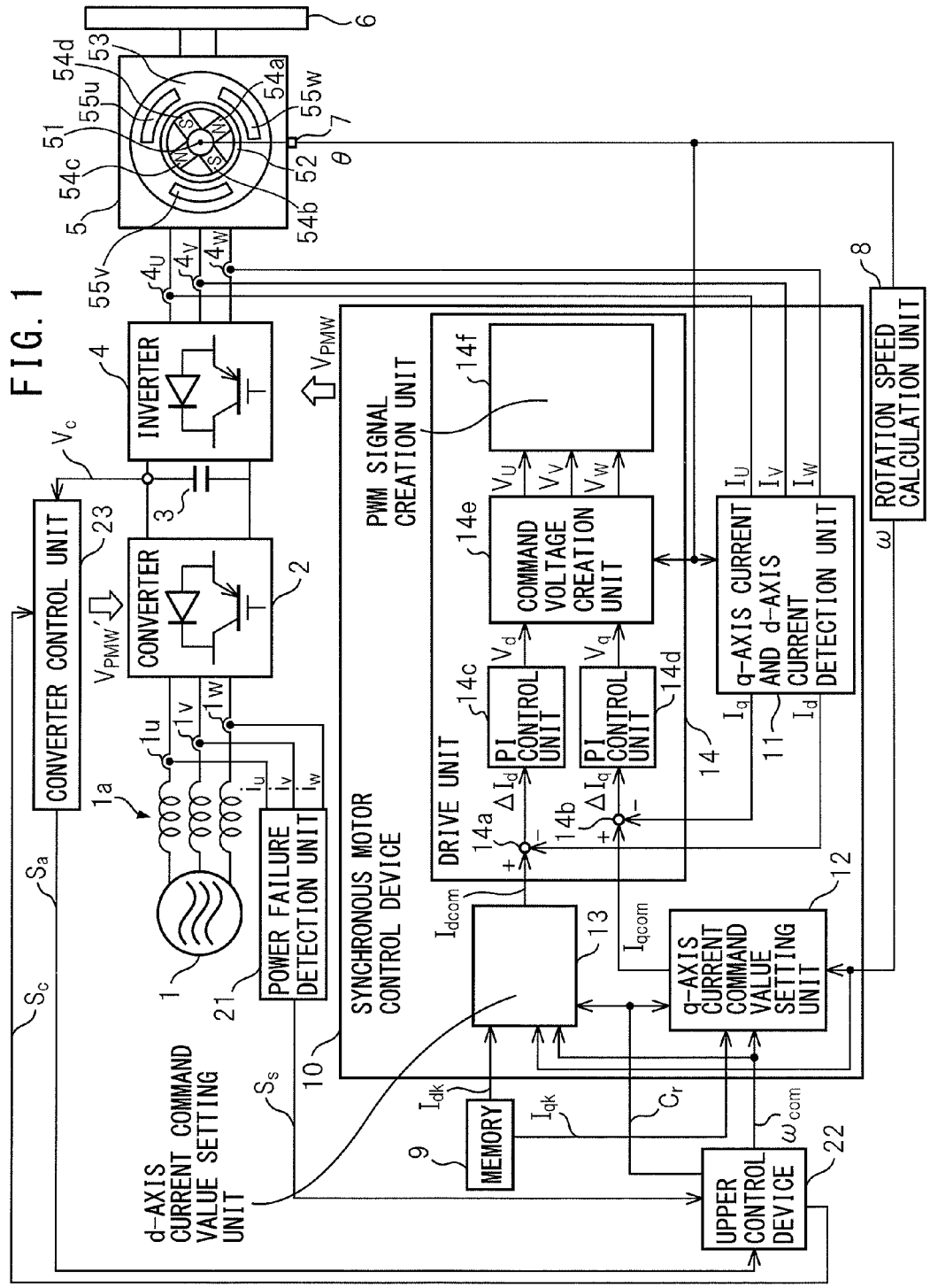
FIG. 1 is a block diagram of a system having a synchronous motor control device of an embodiment of the present invention.

Referring to the drawings, FIG. 1 is a block diagram of a system having a synchronous motor control device of an embodiment of the present invention. The system shown in FIG. 1 has a three-phase alternating-current power source 1 as an alternating-current power source, a converter 2, a smoothing capacitor 3 as a DC link part, an inverter 4, a permanent magnet synchronous motor 5 as a synchronous motor, a driven object 6, a position detection unit 7, a rotation speed calculation unit 8, a memory 9, a synchronous motor control device 10, a power failure detection unit 21, an upper control device 22 and a converter control unit 23.

The converter 2 consists of a plurality (six, in the case of three-phase alternating current) of rectifier diodes and transistors connected in inverse parallel to the rectifier diodes, respectively, for example, and converts alternating-current power supplied from the three-phase alternating-current power source 1 into direct-current power. The smoothing capacitor 3 is connected in parallel to the converter 2 in order to smooth a voltage rectified by the rectifier diode of the converter 2. The inverter 4 is connected in parallel to the smoothing capacitor 3, consists of a plurality (six, in the case of three-phase alternating current) of rectifier diodes and transistors connected in inverse parallel to the rectifier diodes, respectively, for example, and converts the direct-current power into which converted by the converter 2 into alternating-current power by turning on and off the transistors based on a PWM signal $V_{PWM}$ to be described later.

The permanent magnet synchronous motor 5 may be any motor to which the driven object 6, such as a table connected to the permanent magnet synchronous motor 5, an arm connected thereto, and a work attached to the table or the arm and detached from the table or the arm, is connected and which is configured to change the position and attitude of the table that holds the work in a machine tool or to rotate and operate an arm of a robot, etc. In the present embodiment, the permanent magnet synchronous motor 5 is a rotary servomotor including a rotor 52 having a rotating shaft 51 to which the position detection unit 7 is attached and a stator 53 arranged so as to surround the rotor 52.

The rotor 52 has four permanent magnets 54a, 54b, 54c, and 54d arranged at 90° intervals. The permanent magnets 54a, 54b, 54c and 54d are arranged so that the end parts thereof on the side of the stator 53 are separated 90° from one another in the rotation direction of the rotor 52 and the end parts on the outside of the permanent magnets 54a, 54b, 54c and 54d are alternately the N pole, S pole, N pole, and S pole.

The stator 53 has three windings 55u, 55v, and 55w arranged at 120° intervals and to which a U-phase current $I_U$, a V-phase current $I_V$ and a W-phase current $I_W$ as a first phase current, a second phase current, and a third phase current are supplied, respectively. Consequently, the permanent magnet synchronous motor 5 functions as a three-phase synchronous motor.

In the present embodiment, the stator 53 has coils (the windings 55u, 55v, 55w) and serves as a primary side that receives power and the rotor 52 has magnets (the permanent magnets 54a, 54b, 54c, 54d) and serves as a secondary side that is subjected to forces from the primary side.

The position detection unit 7 consists of a rotary encoder configured to detect a rotation angle θ of the rotor 52 as a position of the rotor. The rotation speed calculation unit 8 calculates a rotation speed ω of the rotor 52 corresponding to the frequency of the U-phase current $I_U$, the V-phase current $I_V$ and the W-phase current $I_W$ by differentiating the rotation angle θ, which is input to the rotation speed calculation unit 8, with respect to time, and outputs the rotation speed ω to the synchronous motor control device 10.

The memory 9 stores a lookup table representing a relationship between a rotation speed command value $ω_{com}$, which is a speed command value for the rotor 52 to be input from the upper control device 22 to the synchronous motor control device 10, and a q-axis current value $I_{qk}$ and a d-axis current value $I_{dk}$, which are set as a second q-axis current command value and a second d-axis current command value when the three-phase alternating-current power source 1 fails at the time of the driving of the permanent magnet synchronous motor 5.

If electric power per unit time (for example, the control period of the synchronous motor control device 10 (for example, 250 microseconds)), which is supplied from the inverter 4 to the permanent magnet synchronous motor 5, is represented by Pm, power per unit time of the permanent magnet synchronous motor 5, which works on the outside of the permanent magnet synchronous motor 5 by rotating the rotor 52, is represented by Pw, and loss per unit time of the permanent magnet synchronous motor 5, such as copper loss and iron loss, is represented by Pl, the following relationship holds $$Pm = Pw + Pl \qquad (1).$$

The power Pw becomes larger than zero value when the speed of the permanent magnet synchronous motor 5 increases, and the power Pw becomes smaller than zero value when the speed of the permanent magnet synchronous motor 5 reduces. The loss Pl is always larger than zero value. The polarity of the electric power Pm changes depending on the value of the power Pw and the value of the loss Pl, the state when the electric power Pm is larger than zero value corresponds to the state where the alternating-current power is supplied from the inverter 4 to the permanent magnet synchronous motor 5 (power running operation), and the state when the electric power Pm is smaller than zero value corresponds to the state where the alternating-current power is supplied from the permanent magnet synchronous motor 5 to the inverter 4 (power regenerative operation). If regenerative power, which is returned from the permanent magnet synchronous motor 5 to the inverter 4 during the speed reduction of the permanent magnet synchronous motor 5, is represented by Pr, the following relationship holds $$Pr = -Pm = -(Pw + Pl) = |Pw| - Pl \qquad (2).$$

Rotation energy Erev=ΣPw of the rotor 52 is accumulated in the rotor 52 when the speed of the permanent magnet synchronous motor 5 increases, the permanent magnet synchronous motor 5 works as a generator when the speed of the permanent magnet synchronous motor 5 reduces, and therefore, the rotation energy Erev of the rotor 52, which is accumulated in the rotor 52, is supplied to the smoothing capacitor 3, as electric energy.

According to the present embodiment, the q-axis current value $I_{qk}$ and the d-axis current value $I_{dk}$ are set so that the absolute value |Pw| of the power Pw per unit time of the permanent magnet synchronous motor 5 is equal to the loss Pl per unit time of the permanent magnet synchronous motor 5. In the case where the absolute value |Pw| of the power Pw per unit time of the permanent magnet synchronous motor 5 is equal to the loss Pl per unit time of the permanent magnet synchronous motor 5, the regenerative power Pr is zero as will be seen from the equation (2).

Setting of the q-axis current value $I_{qk}$ and the d-axis current value $I_{dk}$ is explained in more detail.

In the equation (2), if the regenerative power Pr is taken to be zero, the following relationship holds $$|Pw| - Pl = 0 \qquad (3).$$

Consequently, the following relationship holds between the power Pw and the loss Pl $$|Pw| = Pl \qquad (4).$$

The power Pw can be represented by the product of a torque constant Kt, the q-axis current value $I_{qk}$, and the rotation speed ω. I.e., the following relationship holds $$Kt \times I_{qk} \times w = Pw \qquad (5)$$

If the inertia of the rotor 52 is represented by J, the following relationship holds $$E_{rev} = \frac{1}{2} J \omega^2. \qquad (6)$$

By subjecting the equation (6) to the first differentiation with respect to time t, the following equation is obtained $$\frac{dE_{rev}}{dt} = J\omega \frac{d\omega}{dt}. \qquad (7)$$

The power Pw is equal to the first derivative of the rotation energy Erev with respect to time t., i.e., the following relationship holds $$Pw = \frac{dE_{rev}}{dt}. \qquad (8)$$

From the equation (7) and the equation (8), it is known that the following relationship holds $$Pw = J\omega \frac{d\omega}{dt}. \qquad (9)$$

On the other hand, the loss Pl can be represented by multiplying a resistance value R of one of the windings 55u, 55v, and 55w by the sum of the square value of the q-axis current value $I_{qk}$ and the square value of the d-axis current value $I_{dk}$, i.e., the following relationship holds $$3(I_{qk}^2 + I_{dk}^2)R = Pl \qquad (10).$$

Consequently, as represented by the equation (4), it is possible to consume all the regenerative power Pr, which corresponds to the regenerative energy of the permanent magnet synchronous motor 5 when the three-phase alternating-current power source 1 fails at the time of the driving of the permanent magnet synchronous motor 5, within the permanent magnet synchronous motor 5, i.e., within the windings 55u, 55v, and 55w, by setting the q-axis current value $I_{qk}$ and the d-axis current value $I_{dk}$ so that the absolute value |Pw| of the power Pw is equal to the loss Pl.

If the equation (5) is solved for the q-axis current value $I_{qk}$, the following equation is obtained $$I_{qk} = \frac{Pw}{Kt \times \omega}. \tag{11}$$

Further, if the q-axis current value $I_{qk}$, which is obtained by the equation (11), is substituted in the equation (10), the absolute value |Pw| of the power Pw is substituted in the loss Pl using the equation (4), and the equation is solved for the d-axis current value $I_{dk}$, the following equation is obtained $$I_{dk} = \sqrt{\frac{|Pw|}{3R} - \left(\frac{Pw}{Kt \times \omega}\right)^2}. \tag{12}$$

In order to set the q-axis current value $I_{qk}$ and the d-axis current value $I_{dk}$ so that the absolute value |Pw| of the power Pw is equal to the loss Pl, the q-axis current value $I_{qk}$ can be set based on the difference between the rotation speed ω and the rotation speed command value $\omega_{com}$, and the d-axis current value $I_{dk}$ can be set based on the q-axis current value $I_{qk}$, which is set based on the difference between the rotation speed ω and the rotation speed command value $\omega_{com}$. In this case, the power Pw is calculated by substituting the q-axis current value $I_{qk}$, which is set based on the different between the rotation speed ω and the rotation speed command value $\omega_{com}$, into the equation (5), and the d-axis current value $I_{dk}$ is calculated by substituting the calculated power Pw into the equation (12). As will be described later, a q-axis current command value $I_{qcom}$ when the power failure detection unit 21 does not detect the power failure of the three-phase alternating-current power source 1 at the time of the driving of the permanent magnet synchronous motor 5, as a first q-axis current command value, as a first q-axis current command value, is set based on the difference between the rotation speed ω and the rotation speed command value $\omega_{com}$. Consequently, in the case where the q-axis current value $I_{qk}$ is set based on the difference between the rotation speed ω and the rotation speed command value $\omega_{com}$, the q-axis current command value $I_{qcom}$ is set based on the difference between the rotation speed ω and the rotation speed command value $\omega_{com}$ whether or not the three-phase alternating-current power source 1 fails, i.e., it is no longer necessary to change the setting of the q-axis current command value $I_{qcom}$ depending on whether or not the three-phase alternating-current power source 1 fails, and therefore, it is possible to simplify the control of the synchronous motor control device 10 compared to the case where the setting of the q-axis current command value $I_{qcom}$, is changed depending on whether or not the three-phase alternating-current power source 1 fails.

In order to set the q-axis current value $I_{qk}$ and the d-axis current value $I_{dk}$ so that the absolute value |Pw| of the power Pw is equal to the loss Pl, the q-axis current value $I_{qk}$ and the d-axis current value $I_{dk}$ can be set based on a maximum power consumption, which can be accepted by the permanent magnet synchronous motor 5, or a predetermined maximum power consumption Pmax. The power consumption Pmax is calculated as the product of a predetermined maximum current value Imax and a predetermined maximum voltage value Vmax, which can be accepted by the permanent magnet synchronous motor 5, or is given as a predetermined maximum power consumption by an operator. In this case, the following relationship holds $$Pw = Pmax \tag{13},$$

and therefore, the q-axis current value $I_{qk}$ can be calculated by substituting the power Pw, which is represented by the equation (13), into the equation (11) and the d-axis current value $I_{dk}$ can be calculated by substituting the power Pw, which is represented by the equation (13), into the equation (12). By setting the q-axis current value $I_{qk}$ and the d-axis current value $I_{dk}$ based on the maximum power consumption, which can be accepted by the permanent magnet synchronous motor 5, or the predetermined maximum power consumption Pmax in this way, the maximum q-axis current value, which can be accepted by the permanent magnet synchronous motor 5, or the maximum q-axis current value $I_{qk}$, which satisfies the predetermined maximum power consumption Pmax, can be set, and therefore, it is possible to minimize the distance, i.e., the elapsed time until the permanent magnet synchronous motor 5 comes to a stop when the three-phase alternating-current power source 1 fails at the time of the driving of the permanent magnet synchronous motor 5.

As described above, the relationship between the rotation speed command value $\omega_{com}$, and the q-axis current value $I_{qk}$ and the d-axis current value $I_{dk}$ is determined uniquely in the lookup table, which is stored in the memory 9, and therefore, the q-axis current value $I_{qk}$ and the d-axis current value $I_{dk}$ are determined uniquely when the rotation speed command value $\omega_{com}$ is determined uniquely. Consequently, the synchronous motor control device 10 reads the q-axis current value $I_{qk}$ and the d-axis current value $I_{dk}$ in accordance with the rotation speed command value $\omega_{com}$ during speed reduction of the permanent magnet synchronous motor 5 due to the power failure of the three-phase alternating-current power source 1, and uses the q-axis current value $I_{qk}$ and the d-axis current value $I_{dk}$, which are read, as the q-axis current command value $I_{qcom}$ and the d-axis current command value $I_{dk}$, respectively.

In the present embodiment, a first limit value of the q-axis current command value $I_{qcom}$, i.e., the q-axis current value $I_{qk}$, which is provided to limit the torque of the permanent magnet synchronous motor 5 when the three-phase alternating-current power source 1 fails at the time of the driving of the permanent magnet synchronous motor 5, is set to a value smaller than a second limit value of the q-axis current command value qcom r which is provided to limit the torque of the permanent magnet synchronous motor 5 when the three-phase alternating-current power source 1 does not fail at the time of the driving of the permanent magnet synchronous motor 5. Due to this, it is possible to reduce the torque, which is generated by the permanent magnet synchronous motor 5 during the speed reduction of the permanent magnet synchronous motor 5 when the three-phase alternating-current power source 1 fails, compared to the torque, which is generated by the permanent magnet synchronous motor 5 when the three-phase alternating-current power source 1 does not fail at the time of the driving of the permanent magnet synchronous motor 5, and therefore, it is possible to keep the regenerative power Pr, which is generated by the permanent magnet synchronous motor 5 when the three-phase alternating-current power source 1 fails at the time of the driving of the permanent magnet synchronous motor 5, low.

If the regenerative power Pr is reduced by providing the first limit value, as will be seen from the equation (5) and the equation (12), the d-axis current value $I_{dk}$ can be reduced. In order to improve the operating efficiency of the permanent magnet synchronous motor 5, it is desirable to keep the value of a d-axis current $I_d$ to be described later, which does not contribute to generation of a torque, as small as possible. Consequently, the operating efficiency of the permanent magnet synchronous motor 5 can be improved by providing the first limit value to reduce the d-axis current value $I_{dk}$.

The synchronous motor control device 10 carries out vector control to control the q-axis current of the permanent magnet synchronous motor 5, which corresponds to the torque current, and the d-axis current of the permanent magnet synchronous motor 5, which does not contribute to the torque current (The d-axis current of the permanent magnet synchronous motor 5 corresponds to the magnetic excitation current), independently from each other in order to control the permanent magnet synchronous motor 5 to carry out power regenerative operation to return regenerative energy, which is generated during the speed reduction of the permanent magnet synchronous motor 5, to the side of the three-phase alternating-current power source 1 and stop the permanent magnet synchronous motor 5 when the three-phase alternating-current power source 1 fails. To do this, the synchronous motor control device 10 includes a q-axis current and d-axis current detection unit 11, a q-axis current command value setting unit 12, a d-axis current command value setting unit 13 and a drive unit 14.

In the present embodiment, the rotation speed calculation unit 8, the memory 9, the q-axis current and d-axis current detection unit 11, the q-axis current command value setting unit 12, the d-axis current command value setting unit 13, the drive unit 14 and the power failure detection unit 21 are implemented by a processor including an input/output port, a serial communication circuit, an A/D converter, a comparator, etc., and carry out processing, to be explained later, in accordance with processing programs stored in a memory, not shown schematically.

The q-axis current and d-axis current detection unit 11 detects a q-axis current $I_g$ and the d-axis current $I_d$, based on the three phases of the U-phase current $I_U$, the V-phase current $I_V$ and the W-phase current $I_W$, which flow through the permanent magnet synchronous motor 5, and the rotation angle $\theta$. To do this, the q-axis current and d-axis current detection unit 11 consists of a coordinate converter configured to carry out rotation coordinate conversion and three-phase to two-phase conversion. Consequently, the q-axis current and d-axis current detection unit 11 converts the three phases of the U-phase current $I_U$, the V-phase current $I_V$ and the W-phase current $I_W$ in the stationary coordinate system (UVW coordinate system) into the two phases of the q-axis current $I_g$ and the d-axis current $I_d$, which are represented in the rotation coordinate system rotated through the rotation angle $\theta$ relative to the stationary coordinate system ($\alpha\beta$ coordinate system), and outputs the q-axis current $I_g$ and the d-axis current $I_d$ to the drive unit 14.

In this case, the three phases of the U-phase current $I_U$, the V-phase current $I_V$ and the W-phase current $I_W$ are detected by current detection units 4U, 4V and 4W, which are provided in the output line of the inverter 4, and current detection signals, which are output from the current detectors 4U, 4V and 4W, are input to an A/D converter, not shown schematically, and are converted into digital data. The current detection units 4U, 4V and 4W consist of hole elements, for example.

The rotation speed command value $\omega_{com}$ and the rotation speed $\omega$ are input to the q-axis current command value setting unit 12. The q-axis current command value setting unit 12 creates the q-axis current command value $I_{qcom}$, based on the rotation speed command value $\omega_{com}$ and the rotation speed $\omega$, when the power failure detection unit 21 does not detect the power failure of the three-phase alternating-current power source 1 at the time of the driving, which includes the driving during the speed reduction of the permanent magnet synchronous motor 5. To do this, the q-axis current command value setting unit 12 creates the q-axis current command value $I_{qcom}$, as the first q-axis current command value, by making proportional integral calculation of a rotation speed deviation $\Delta\omega$, which is the result of subtraction between the rotation speed command value $\omega_{com}$ and the rotation speed $\omega$, and outputs the q-axis current command value $I_{qcom}$ to the drive unit 14.

On the other hand, the q-axis current command value setting unit 12 sets the q-axis current command value $I_{qcom}$ to the q-axis current value $I_{qk}$, which is read from the memory 9 in accordance with the rotation speed command value $\omega_{com}$ when the power failure detection unit 21 detects the power failure of the three-phase alternating-current power source 1 at the time of the driving, which includes the driving during the speed reduction of the permanent magnet synchronous motor 5. The q-axis current value $I_{qk}$, which corresponds to the q-axis current command value $I_{qcom}$, as the second q-axis current command value, is set to the value equal to or less than the q-axis current command value $I_{qcom}$ in the case where the power failure of the three-phase alternating-current power source 1 is not detected under the conditions of the same rotation speed command value $\omega_{com}$ and the same rotation speed w, in order to stop the permanent magnet synchronous motor 5.

The rotation speed command value $\omega_{com}$ and the rotation speed $\omega$ are input to the d-axis current command value setting unit 13. The d-axis current command value setting unit 13 creates a d-axis current command value $I_{dcom}$, which has zero value, as the first d-axis current command value, when the power failure detection unit 21 does not detect the power failure of the three-phase alternating-current power source 1 at the time of the driving of the permanent magnet synchronous motor 5.

On the other hand, the d-axis current command value setting unit 13 sets the d-axis current command value $I_{dcom}$ to the d-axis current value $I_{dk}$, which is read from the memory 9 in accordance with the rotation speed command value $\omega_{com}$, as the second d-axis current command value, when the power failure detection unit 21 detects the power failure of the three-phase alternating-current power source 1 at the time of the driving of the permanent magnet synchronous motor 5. The d-axis current value $I_{dk}$, which is set here, will be a value larger than zero so that the regenerative power Pr, which is generated when the three-phase alternating-current power source 1 fails at the time of the driving of the permanent magnet synchronous motor 5, is consumed within the permanent magnet synchronous motor 5.

The drive unit 14 drives the permanent magnet synchronous motor 5, based on the q-axis current $I_V$ the d-axis current $I_d$, the q-axis current command value $I_{qcom}$ and the d-axis current command value $I_{dcom}$. To do this, the drive unit 14 has subtractors 14a and 14b, PI control units 14c and 14d, a command voltage creation unit 14e and a PWM signal generation unit 14f.

The subtractor 14a has a non-inversion input part to which the d-axis current command value $I_{dcom}$ is input, an inversion input part to which the d-axis current $I_d$ is input, and an output part configured to output a current deviation $\Delta I_d$, which is a result of subtraction between the d-axis current command value $I_{dcom}$ and the value of the d-axis current $I_d$. The subtractor 14b has a non-inversion input part to which the q-axis current command value $I_{qcom}$ is input, an inversion input part to which the q-axis current $I_q$ is input, and an output part configured to output a current deviation $\Delta I_q$, which is a result of subtraction between the q-axis current command value $I_{qcom}$ and the value of the q-axis current $I_q$.

The current deviation $\Delta I_d$ is input to the PI control unit 14c, and the PI control unit 14c creates the d-axis voltage command value $V_d$ by making proportional integral calculation of the current deviation $\Delta I_d$ and outputs the d-axis voltage command value $V_d$ to the command voltage creation unit 14e. The current deviation $\Delta I_q$ is input to the PI control unit 14d, and the PI control unit 14d creates the q-axis voltage command value $V_q$ by making proportional integral calculation of the current deviation $\Delta I_q$ and outputs the q-axis voltage command value $V_q$ to the command voltage creation unit 14e.

The command voltage creation unit 14e creates a U-phase voltage command value $V_U$, a V-phase voltage command value $V_V$ and a W-phase voltage command value $V_W$ based on a q-axis voltage command value $V_q$ and a d-axis voltage command value $V_d$. To do this, the command voltage creation unit 14e consists of a coordinate converter configured to carry out rotation coordinate conversion and two-phase to three-phase conversion. Consequently, the command voltage creation unit 14e converts two phases of the d-axis voltage command value $V_d$ and the q-axis voltage command value $V_q$, which is expressed by the rotation coordinate system rotated by the rotation angle θ with respect to the stationary coordinate system (αβ coordinate system), into three phases of the U-phase voltage command value $V_U$, the V-phase voltage command value $V_V$ and the W-phase voltage command value $V_W$, and outputs the U-phase voltage command value $V_U$, the V-phase voltage command value $V_V$ and the W-phase voltage command value $V_W$ to the PWM signal generation unit 14f.

The PWM signal generation unit 14f generates the PWM signal $V_{PWM}$ (in this case, $V_{PWM1}$, $V_{PWM2}$, $V_{PWM3}$, $V_{PWM4}$, $V_{PWM5}$ and $V_{PWM6}$ corresponding to each transistor of the inverter 4), based on the U-phase voltage command value $V_U$, the V-phase voltage command value $V_V$ and the W-phase voltage command value $V_W$, and outputs the PWM signal $V_{PWM}$ to the inverter 4 to drive the permanent magnet synchronous motor 5.

The power failure detection unit 21 detects power failure of the three-phase alternating-current power source 1. To do this, the power failure detection unit 21 has a rectifier circuit (not shown schematically) having a plurality (six, in the case of the three-phase alternating current) of rectifier diodes configured to rectify three phases of a U-phase current $i_U$, a V-phase current $i_V$ and a W-phase current $i_W$ detected by current detectors 1U, 1V and 1W, which is provided in the output line of the three-phase alternating-current power source 1, and a comparator (not shown schematically) configured to compare the level of an output signal from the rectifier circuit with the reference level and to output a power failure detection signal $S_s$ to the upper control device 22 if the level of the output signal is lower than the reference level.

The upper control device 22 consists of a CNC (computer numerical control), etc., and inputs the rotation speed command value $\omega_{com}$ to the q-axis current command value setting unit 12 and the d-axis current command value setting unit 13. Further, the upper control device 22 outputs a speed reduction command Cr to the q-axis current command value setting unit 12 and the d-axis current command value setting unit 13 during speed reduction of the permanent magnet synchronous motor 5. The upper control device 22 can determine whether or not the speed reduction of the permanent magnet synchronous motor 5 occurs by determining, for example, whether or not the reduction value of the current rotation speed command value from the previous rotation speed command value is equal to or larger than a predetermined value.

In the present embodiment, if the upper control device 22 outputs the speed reduction command $C_r$ to the q-axis current command value setting unit 12 and the d-axis current command value setting unit 13 during the speed reduction of the permanent magnet synchronous motor 5 in response to the power failure detection signal $S_s$ from the power failure detection unit 21, the upper control device 22 outputs the speed reduction command $C_r$ with a power failure flag to the q-axis current command value setting unit 12 and the d-axis current command value setting unit 13. The q-axis current command value setting unit 12 and the d-axis current command value setting unit 13 can determine whether or not the speed reduction of the permanent magnet synchronous motor 5 is speed reduction of the permanent magnet synchronous motor 5 due to the power failure of the three-phase alternating-current power source 1 by identifying whether or not a power failure flag is attached to the speed reduction command $C_r$.

Further, the upper control device 22 outputs a power regenerative operation command signal Sc to the converter control unit 23 in order to carry out the power regenerative operation to return the regenerative energy, which is generated during the speed reduction of the permanent magnet synchronous motor 5, to the side of the three-phase alternating-current power source 1. In this case, the upper control device 22 outputs the rotation speed command value $\omega_{com}$, which corresponds to the PWM signal $V_{PWM}$ to the q-axis current command value setting unit 12 and the d-axis current command value setting unit 13 in order to carry out turning on and off of the transistor of the inverter 4 by outputting the PWM signal $V_{PWM}$ from the drive unit 14 to the inverter 4.

The converter control unit 23 generates a PWM signal $V_{PWM}'$ (in this case, $V_{PWM1}'$, $V_{PWM2}'$, $V_{PWM3}'$, $V_{PWM4}'$, $V_{PWM5}'$ and $V_{PWM6}'$ corresponding to each transistor of the inverter 4) based on the power regenerative operation command signal Sc and outputs the PWM signal $V_{PWM}'$ to the converter 2 to carry out the power regenerative operation. Further, the converter control unit 23 has a comparator (not shown schematically) configured to detect a voltage (DC link voltage) $V_c$ across the smoothing capacitor 3, and to output an alarm signal $S_a$ to the upper control device 22 if the level of the voltage $V_c$ at the time of the driving of the permanent magnet synchronous motor 5, which includes the driving of the permanent magnet synchronous motor 5 during the speed reduction of the permanent magnet synchronous motor 5 due to the power failure of the three-phase alternating-current power source 1, exceeds a destruction level.

In the present embodiment, the converter control unit 23 is implemented by a processor including an input/output port, a serial communication circuit, an A/D converter, a comparator, etc., and carries out control of the converter 2 to carry out the power regenerative operation in accordance with processing programs stored in a memory, not shown schematically. Further, in the present embodiment, in order to carry out the power regenerative operation, a reactor 1a is arranged between the three-phase alternating-current power source 1 and the current detectors 1U, 1V and 1W.

Figure 2:
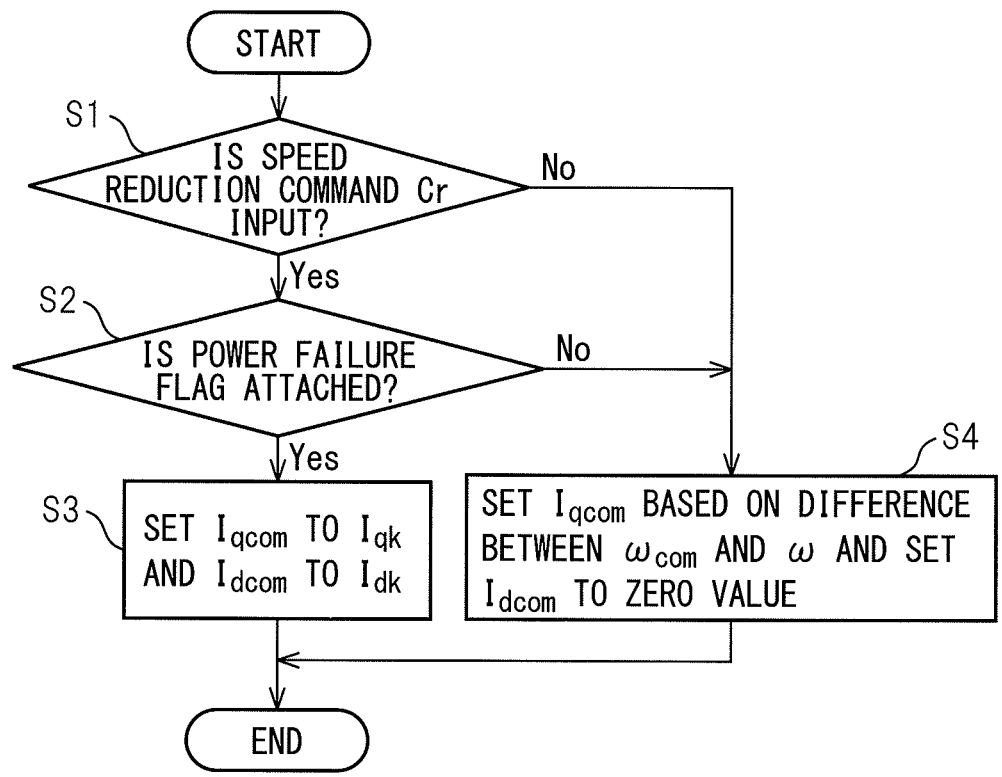
FIG. 2 is a flowchart of an operation of the synchronous motor control device in FIG. 1.

FIG. 2 is a flowchart of operation of the motor control device in FIG. 1. This flowchart is carried out for each control period (for example, 250 microseconds) during driving of the permanent magnet synchronous motor 5 and controlled by processing programs in which the synchronous motor control device 10 executes.

First, each of the q-axis current command value setting unit 12 and the d-axis current command value setting unit 13 determines whether or not the speed reduction command $C_r$ is input (step S1). If the speed reduction command $C_r$ is input, each of the q-axis current command value setting unit 12 and the d-axis current command value setting unit 13 determines whether or not a power failure flag is attached to the speed reduction command $C_r$ (step S2). If a power failure flag is attached to the speed reduction command $C_r$, the q-axis current command value setting unit 12 reads the q-axis current value $I_{qk}$ in accordance with the rotation speed command value $\omega_{com}$ from the memory 9 and outputs the q-axis current value $I_{qk}$, which is read, to the subtractor 14b as the q-axis current command value $I_{qcom}$, and the d-axis current command value setting unit 13 reads the d-axis current value $I_{dk}$ in accordance with the rotation speed command value $\omega_{com}$ from the memory 9 and outputs the d-axis current value $I_{dk}$, which is read, to the subtractor 14a as the d-axis current command value $I_{dcom}$ (step S3), and the synchronous motor control device 10 exits the processing flow.

After step S3, an actual current (apparent current) $I_{rk}$, which is the square root of the sum of the square value of the q-axis current value $I_{qk}$ and the square value of the d-axis current value $I_{dk}$, is generated on the output side of the inverter 4.

On the other hand, if it is determined that the speed reduction command $C_r$ is not input in step S1 or it is determined that no power failure flag is attached to the speed reduction command $C_r$ in step S2, the q-axis current command value setting unit 12 sets a q-axis current value $I_{q\omega}$, based on the difference between the rotation speed command value $\omega_{com}$ and the rotation speed $\omega$, and outputs the q-axis current value $I_{q\omega}$, which is set, to the subtractor 14b, as the q-axis current command value $I_{qcom}$, and the d-axis current command value setting unit 13 sets a d-axis current value $I_{d\omega}$, which has zero value, and outputs the set d-axis current value $I_{d\omega}$, which has zero value, to the subtractor 14a, as the d-axis current command value $I_{dcom}$ (step S3), and the synchronous motor control device 10 exits the processing flow.

After step S4, the square root of the sum of the square value of the q-axis current value $I_{q\omega}$ and the square value of the d-axis current value $I_{d\omega}$, i.e., an actual current (apparent current) $I_{rk}'$, which has a value of the q-axis current value $I_{g\omega}$, is generated on the output side of the inverter 4.

Figure 3:
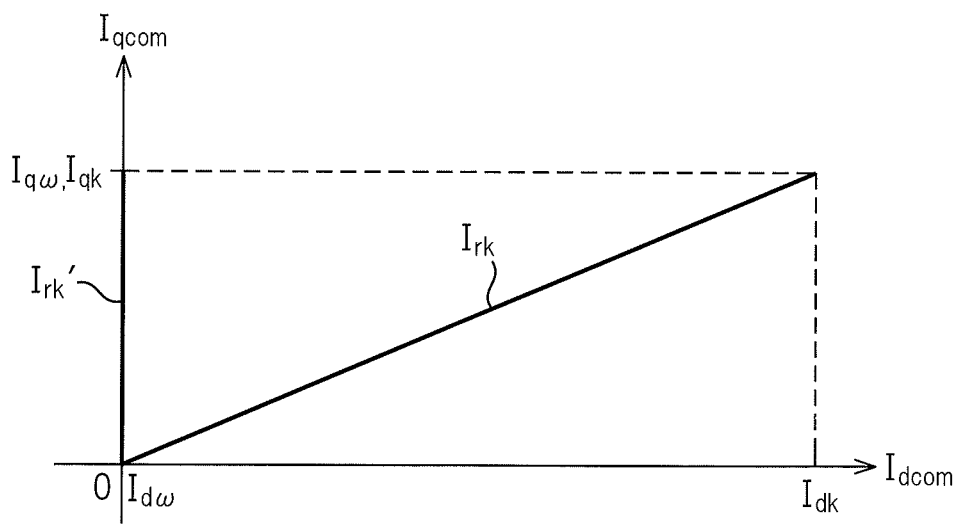
FIG. 3 is a diagram for explaining a first setting example of a q-axis current command value and a d-axis current command value.

FIG. 3 is a diagram for explaining a first setting example of the q-axis current command value and the d-axis current command value. The setting example shown in FIG. 3 shows the case where the q-axis current value $I_{qk}$ is set based on the difference between the rotation speed $\omega$ and the rotation speed command value $\omega_{com}$ and the d-axis current value $I_{dk}$ is set based on the q-axis current value $I_{qk}$, which is set based on the difference between the rotation speed $\omega$ and the rotation speed command value $\omega_{com}$. In this case, both the q-axis current value $I_{q\omega}$ and the q-axis current value $I_{qk}$ are set based on the difference between the rotation speed $\omega$ and the rotation speed command value $\omega_{com}$, and therefore, the q-axis current value $I_{qk}$ is equal to the q-axis current value $I_{q\omega}$.

Figure 4:
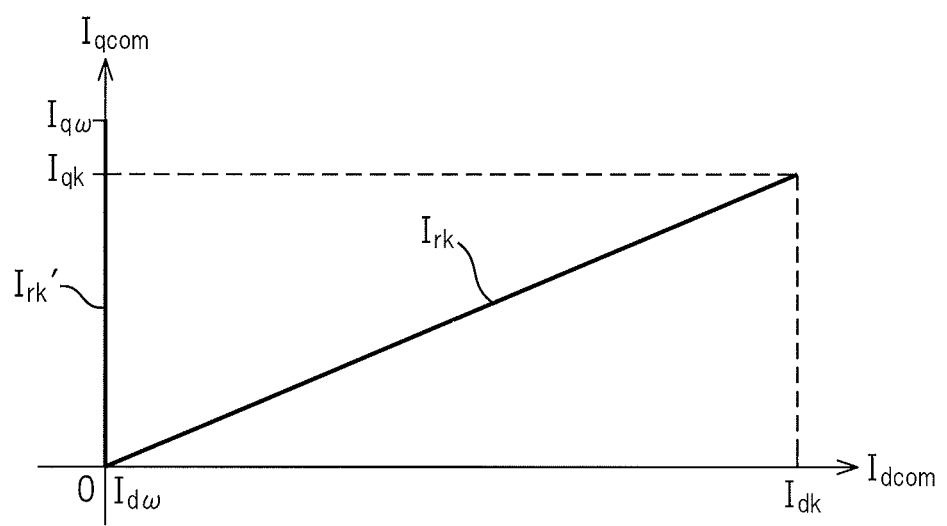
FIG. 4 is a diagram for explaining a second setting example of a q-axis current command value and a d-axis current command value.

FIG. 4 is a diagram for explaining a second setting example of the q-axis current command value and the d-axis current command value. The setting example shown in FIG. 4 shows the case where the q-axis current value $I_{qk}$ and the d-axis current value $I_{dk}$ are set based on the maximum power consumption, which can be accepted by the permanent magnet synchronous motor 5, or the predetermined maximum power consumption Pmax. In this case, the q-axis current value $I_{qk}$ is set to the value equal to or lower than the q-axis current value $I_{q\omega}$ in the case where the power failure of the three-phase alternating-current power source 1 is not detected under the condition of the same rotation speed command value $\omega_{com}$ and the same rotation speed $\omega$, in order to stop the permanent magnet synchronous motor 5.

According to the present embodiment, the regenerative power Pr, which is generated when the three-phase alternating-current power source 1 fails at the time of driving of the permanent magnet synchronous motor 5, becomes zero by setting the q-axis current value $I_{qk}$ and the d-axis current value $I_{dk}$ so that the absolute value |Pw| of the power Pw is equal to the loss Pl. Consequently, it is possible to avoid the over-voltage across the smoothing capacitor 3 without adversely affecting the cost and the operating efficiency of the permanent magnet synchronous motor 5 and stop the permanent magnet synchronous motor 5 both quickly and safely without issuing an over-voltage alarm when the three-phase alternating-current power source 1 fails.

In the case where the q-axis current value $I_{qk}$ is set, based on the difference between the rotation speed $\omega$ and the rotation speed command value $\omega_{com}$, and the d-axis current value $I_{dk}$ is set based on the q-axis current value $I_{qk}$, which is set based on the difference between the rotation speed $\omega$ and the rotation speed command value $\omega_{com}$, it is no longer necessary to change the setting of the q-axis current command value $I_{qcom}$ depending on whether or not the three-phase alternating-current power source 1 fails, and therefore, it is possible to simplify the control of the synchronous motor control device 10 compared to the case where the setting of the q-axis current command value $I_{qcom}$ is changed depending on whether or not the three-phase alternating-current power source 1 fails.

In the case where the q-axis current value $I_{qk}$ and the d-axis current value $I_{dk}$ are set based on the maximum power consumption Pmax (W), which can be accepted by the permanent magnet synchronous motor 5, it is possible to set the maximum q-axis current value $I_{qk}$, which can be accepted by the permanent magnet synchronous motor 5, and minimize the distance, i.e., the elapsed time until the permanent magnet synchronous motor 5 comes to a stop when the three-phase alternating-current power source 1 fails at the time of the driving of the permanent magnet synchronous motor 5.

Further, the first limit value of the q-axis current value $I_{qk}$ is set to the value smaller than the second limit value of the q-axis current command value $I_{qcom}$, and therefore, it is possible to reduce the regenerative power, which is generated by the permanent magnet synchronous motor 5, compared to the case where the three-phase alternating-current power source 1 does not fail at the time of driving of the permanent magnet synchronous motor 5, and improve the operating efficiency of the permanent magnet synchronous motor 5.

The present invention is not limited to the above-mentioned embodiments and there can be a number of alterations and modifications. For example, as an alternating-current power source, the three-phase alternating-current power source 1 is used, however, it is also possible to use a multi-phase alternating-current power source other than the three-phase alternating-current source as a power source.

In the above-mentioned embodiments, the case where the rotary servomotor, in which the permanent magnets 54a, 54b, 54c, and 54d are provided in the rotor 52, is used as the permanent magnet synchronous motor 5 as a synchronous motor, is explained, however, it is possible to use a rotary servomotor, in which permanent magnets are provided in a stator, a linear servomotor, in which permanent magnets are provided in any one of a stator and a slider, a vibration servomotor, in which permanent magnets are provided in any one of a stator and a vibrator, etc., as the permanent magnet synchronous motor 5. It is also possible to use a synchronous motor other than the permanent magnet synchronous motor.

Further, it is possible to configure the rotation position detection unit 7 by a component (for example, hole element or resolver) other than the rotary encoder. It is also possible to omit the rotation position detection unit 7 and to calculate the rotation angle θ and the rotation speed ω, based on the alternating current and the alternating-current voltage supplied to the permanent magnet synchronous motor 5.

In the above-mentioned embodiments, explanation is given on the assumption that the memory 9 is a part of the processor, however, it is also possible to configure the memory 9 as a component other than the processor. Further, it is also possible to provide the memory 9 within the q-axis current command value setting unit 12 or the d-axis current command value setting unit 13.

In the above-mentioned embodiments, the case where the three phases of the U-phase current $I_U$, the V-phase current $I_V$ and the W-phase current $I_W$ are used to detect the q-axis current $I_q$ and the d-axis current $I_d$, is explained, however, it is also possible to detect the q-axis current $I_q$ and the d-axis current $I_d$ using any two phases of the three phases of the U-phase current $I_U$, the V-phase current $I_V$ and the W-phase current $I_W$ (for example, the V-phase current $I_V$ and the W-phase current $I_W$).

In the above-mentioned embodiments, the case where the q-axis current value $I_{qk}$ and the d-axis current value $I_{dk}$, which correspond to the q-axis current command value $I_{qcom}$ and the d-axis current command value $I_{dcom}$ issued during the speed reduction of the permanent magnet synchronous motor 5 due to the power failure of the three-phase alternating-current power source 1, are acquired using the lookup table, is explained, however, it is also possible to acquire the q-axis current value $I_{qk}$ and the d-axis current value $I_{dk}$ using the equation (11) and the equation (12) described above.

Further, in the above-mentioned embodiments, the case where the power failure detection unit 21 outputs the power failure detection signal $S_s$ to the upper control device 22, is explained, however, it is also possible to output the power failure detection signal $S_s$ from the power failure detection unit 21 to the q-axis current command value setting unit 12 and the d-axis current command value setting unit 13, and determine whether or not the power failure of the three-phase alternating-current power source 1 is detected by the q-axis current command value setting unit 12 and the d-axis current command value setting unit 13.

As above, the present invention is explained in relation to the preferred embodiments thereof, however, a person skilled in the art will understand that various alterations and modifications can be made without deviating from the scope of disclosure of claims, as described later.

The invention claimed is:

1. A synchronous motor control device for controlling a synchronous motor to carry out a power regenerative operation to return regenerative energy, which is generated during speed reduction of a synchronous motor and stop the synchronous motor when an alternating-current power source fails, comprising:

a q-axis current and d-axis current detection unit configured to detect a q-axis current, which corresponds to a torque current of the synchronous motor, and a d-axis current, which corresponds to a magnetic excitation current of the synchronous motor, based on at least two of a first phase current, a second phase current and a third phase current, which flow through the synchronous motor, and a position of the synchronous motor;

a q-axis current command value setting unit configured to set a first q-axis current command value of the synchronous motor, based on a difference between a speed of the synchronous motor and a speed command value for the synchronous motor when the alternating-current power source does not fail at the time of driving of the synchronous motor, and to set a second q-axis current command value of the synchronous motor when the alternating-current power source fails at the time of the driving of the synchronous motor;

a d-axis current command value setting unit configured to set a first d-axis current command value of the synchronous motor to zero value when the alternating-current power source does not fail at the time of the driving of the synchronous motor, and to set a second d-axis current command value of the synchronous motor to a value larger than zero when the alternating-current power source fails at the time of the driving of the synchronous motor; and a drive unit configured to drive the synchronous motor based on the q-axis current, the d-axis current, the first or second q-axis current command value, and the first or second d-axis current command value, wherein the second q-axis current command value and the second d-axis current command value are set so that an absolute value of power per unit time of the synchronous motor is equal to loss per unit time of the synchronous motor.

2. The synchronous motor control device according to claim 1, wherein the second q-axis current command value is set based on a difference between the speed of the synchronous motor and the speed command value for the synchronous motor, and the second d-axis current command value is set based on a second q-axis current command value, which is set based on a difference between the speed of the synchronous motor and the speed command value for the synchronous motor.

3. The synchronous motor control device according to claim 1, wherein the second q-axis current command value and the second d-axis current command value are set based on a maximum power consumption, which can be accepted by the synchronous motor, or a predetermined power consumption.

4. The synchronous motor control device according to claim 1, wherein a first limit value of the second q-axis current command value, which is provided to limit a torque of the synchronous motor when an alternating-current power source fails at the time of the driving of a synchronous motor, is set to a value smaller than a second limit value of the second q-axis current command value, which is provided to limit the torque of the synchronous motor when the alternating-current power source does not fail at the time of the driving of the synchronous motor.

* * * * *